United States Patent [19]

Ashdown et al.

[11] 4,175,582
[45] Nov. 27, 1979

[54] ISOLATING/PRESSURE RELIEF DAMPER

[75] Inventors: Ronald A. Ashdown, Redhill; Keith Ewing, Chorleywood; Stuart I. Birkenhead, London, all of England

[73] Assignee: Foster Wheeler Energy Corporation, Livingston, N.J.

[21] Appl. No.: 895,326

[22] Filed: Apr. 11, 1978

[51] Int. Cl.² .............................................. F16K 49/00
[52] U.S. Cl. .................................... 137/334; 137/340; 137/467; 137/601
[58] Field of Search ................ 137/334, 340, 467, 601

[56]  References Cited
U.S. PATENT DOCUMENTS

| 3,525,328 | 8/1970 | Crudden | 137/601 X |
| 3,698,429 | 10/1972 | Lowe et al. | 137/601 |
| 4,022,246 | 5/1977 | Janse | 137/601 |

Primary Examiner—Gerald A. Michalsky
Attorney, Agent, or Firm—Marvin A. Naigur; John E. Wilson; John J. Herguth, Jr.

[57] ABSTRACT

Described herein is a damper for controlling the passage of hot gases through a duct. The damper has a frame through which are passages. Along these passages coolant is passed to cool the frame and so reduce its thermal expansion as a result of the passage of hot gases through the duct. One or more damper blades are positioned within the opening in the frame, these blades being mounted on shafts rotatably journalled in a bearing cooled by the coolant passing through the frame, a seal being provided where the shafts extend through the frame to allow flow of coolant from the frame into the duct and prevent flow in reverse. The edges of the damper may be provided with seals which include a first resilient sealing element having a free end arranged to engage and be deflected by contact with the blade or other component when the blade is in its closed position and a second resilient element arranged to be engaged by and give additional stiffness against further deflection to the first resilient sealing element when the latter has become deflected to a predetermined extent.

10 Claims, 10 Drawing Figures

ISOLATING/PRESSURE RELIEF DAMPER

This invention relates to dampers.

BACKGROUND TO THE INVENTION

When, for example, turbine exhaust gases are passed to a waste heat boiler through a duct it may be necessary to provide means for relieving excess pressures in the duct. Also if it is required to shut down the waste heat boiler for the purposes of, for example, maintenance, the exhaust gases from the turbine will have to be diverted. In order to do this gases can be prevented from reaching the boiler by closing a damper situated in the duct in front of the boiler. The gases can then be diverted through a branch duct leading to, for example, a stack. This branch duct will normally have a damper positioned in it which is opened and through which turbine gases can be passed during shut-down of the boiler. This damper could provide pressure relief when gases are being passed to the boiler.

BRIEF SUMMARY OF THE INVENTION

According to one aspect of the invention there is provided a damper for controlling the passage of hot gases through a duct, the damper comprising a frame defining at least one opening within which is positioned at least one damper blade carried on a shaft supported by the frame so that the damper blade or blades are movable between a closed position in which they block the opening in the frame and an open position in which gases can pass through the opening, the frame having one or more passageways therein through which a coolant can be passed, and at least one end of the shaft or shafts passing through the frame, being rotatably journalled in a bearing cooled by the passage of coolant through the frame and a one-way seal being provided where the shaft or shafts extend through the frame which allow flow of coolant from the frame into the duct and prevent flow in reverse.

By passing coolant, for example cool air, through passageways within the frame thermal expansion of the frame when subjected to hot gases flowing through the duct can be reduced. This reduces the possibility of premature operation of the damper blade mechanism and possible leakage past the blade or blades when it is intended that the damper be shut.

The damper can have a plurality of blades. A suitable number is eight arranged in four pairs within the frame. If the blades are arranged in pairs the frame can be in the form of a rectangle with a central member dividing the rectangle into two smaller rectangles. Four blades can then extend across the opening defined by one of the smaller rectangles and four across the opening defined by the other smaller rectangle.

Preferably the blade has its own shaft, each shaft extending across the smaller rectangular space, and being supported adjacent the central member on a bearing rod extending through the central member and adjacent the outer sides of the frame by extending the shafts through the sides of the frame and through bearings mounted on the sides of the frame. The central bearing rods can, for example be made of a cast iron mechanite material. This will be cooled by the coolant passing through the central member and so be kept at lower temperatures than the shafts which are exposed to hot gases and so the shafts will remain a free fit on these central rods. Additionally any thermal expansion of the shafts can be accommodated at the centre of the frame by the shafts sliding axially relative to the bearing rods. The bearings in the sides of the frame are kept cool by the coolant and will not be exposed to hot gases. To this end these bearings are preferably mounted either outwards of the frame or on the outer wall of the frame.

The one-way seal for restraining the egress of coolant from the frame can be an austenitic stainless steel ring or other heat-resistant spring material which is fixed around its outer periphery to the wall of the passageway through the frame. The inner periphery of the ring surrounds the shaft carrying a damper blade or blades which extends within the passageway and bears on a sleeve fixed over that shaft. If the pressure of the coolant exceeds a certain level the inner periphery of the ring seal is forced away from the sleeve thereby allowing some coolant to escape into the duct in which the damper is positioned. This flow passes over the shaft and helps to cool it. Arrangements are made to ensure that the pressure of the coolant is greater than that of the gas in the duct in which the damper is fitted so that hot duct gas cannot enter the passageways. In order to vary the pressure exerted by the ring seal on the sleeve and consequently the pressure at which coolant is released from the passageway, the position of the sleeve along the shaft can be adjusted to different positions on that part of the shafting positioned within the passageway.

In order to prevent loss of coolant to the atmosphere when the shaft extends completely through the frame, a packing ring e.g., of soft asbestos can be positioned around the shaft on the outer side of the frame and held in place by a ring fixed to the outside of the frame.

Apart from escaping via the one-way seals, coolant can also be arranged to escape through a non-return outlet valve which is preferably positioned at a part of the frame remote from where the coolant is supplied to the passageway or passageways so that a flow of coolant through the frame can be maintained irrespective of the flow through the one-way seals. The ratio of coolant escaping via the one-way seal or seals to that escaping via the non-return valve is chosen so as to obtain the best balance possible with adequate flow of coolant.

According to one embodiment of the invention at least one of the blades is eccentrically mounted on its shaft so that, in operation, that blade is subject to pressure tending to open it.

By eccentrically mounting one or some of the blades the damper can act as a pressure relief damper. Thus, if the pressure in the duct reaches an unduly high level, the eccentrically mounted blades are released and they open under the influence of the gas pressure in the duct. The eccentrically mounted blade or blades can occupy approximately 20% of the blade area of the damper. This area may, however, be varied to suit different conditions. In order to assist the opening of these blades a counterweight can be fixed to the shaft or shafts carrying these blades to increase their tendency to open.

In order to keep the eccentrically mounted blades shut during normal operation they may be fixed to the blade actuating mechanism by means of one or more clutches connected to the shafts on which the blade or blades are mounted. When the pressure in the duct reaches an unduly high level the clutch or clutches can be released by a sensing trip mechanism so that the blade or blades can open.

In a particular embodiment of the invention there are eight damper blades in four sets of two side by side.

Two of the blades act as pressure relief blades providing approximately 25% pressure relief. In this embodiment the blades can for example be approximately 750 mm wide and the pressure relief damper blades can have an offset of approximately 100 mm.

It is also possible to have an embodiment in which there are ten blades in five sets of two side by side. By having one pair of side by side blades e.g. those at one end of the damper acting as pressure relief blades approximately 20% pressure relief is obtained. In this embodiment the blades can for example have a maximum width of approximately 600 mm.

If the gas whose passage is being controlled by the damper is very hot the blades are liable to warp and so not provide a good seal. This can be avoided according to another aspect of the invention by a damper comprising a frame in which is rotatably journalled at least one damper blade movable between a closed position where the opening in the frame is closed and an open position where flow is permitted through the opening in the frame and at least one resilient seal for providing a seal between a blade and another component when the blade is in its closed position, the seal comprising a first resilient sealing element having a free end arranged to engage and be deflected by contact with the said blade or other component when the blade is in its closed position and a second resilient element arranged to be engaged by and give additional stiffness against further deflection to the first resilient sealing element when the latter has become deflected to a predetermined extent.

This arrangement can give an efficient seal both along the axially extending edge of a rectangular damper blade where adjacent blades contact one another or the frame and along the side edges of a damper blade by fixing the seals to the damper frame at positions corresponding to the positions of the edges of the blade when the blade is closed. Any slight opening movement of the blades can be accommodated by the resilience of the element without loss of the seal.

Preferably the first resilient sealing element has its free end positioned around the free end of the second element so giving the two stage resilience, the first elements being in the shape of a crook. A resilient sealing force is created when the blade contacts the first element and a greater resilient force can be created when the blade forces the said first element to bend sufficient to engage the second element. Thus, if because of backlash in the opening and closing mechanism for example, the edge of the blade looses contact with the stop member or adjacent blade any slight rotation of the blade in the opening direction can be taken up by the resilient member and leakage prevented.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
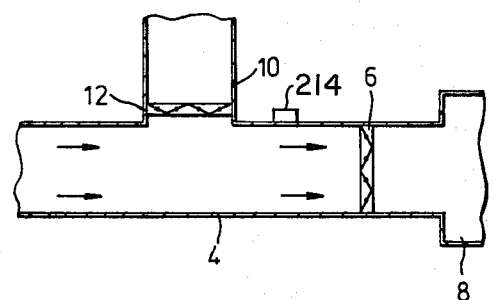
FIG. 1 shows schematically an installation in which a damper according to the invention can be used.

The installation 2 shown schematically in FIG. 1 includes a duct 4 for conveying exhaust gases from a turbine (not shown) which are normally passed through a damper 6 to a waste heat boiler 8. When maintenance operations need to be carried out on the waste heat boiler necessitating the shut-down, the damper 6 is closed and the exhaust gases from the turbine are passed through a branch duct 10 in which is situated a damper 12 according to the invention. As these exhaust gases can be at a temperature of approximately 525° C., it is essential that the damper 12 be one which can work efficiently at such a high temperature.

The damper 12 is also arranged automatically to open partially to relieve any excess pressure in the duct 4 when the damper 6 is open and the waste heat boiler 8 is in operation in a manner which will be described so as to bleed off excess exhaust gas through the duct 10.

Figure 2:
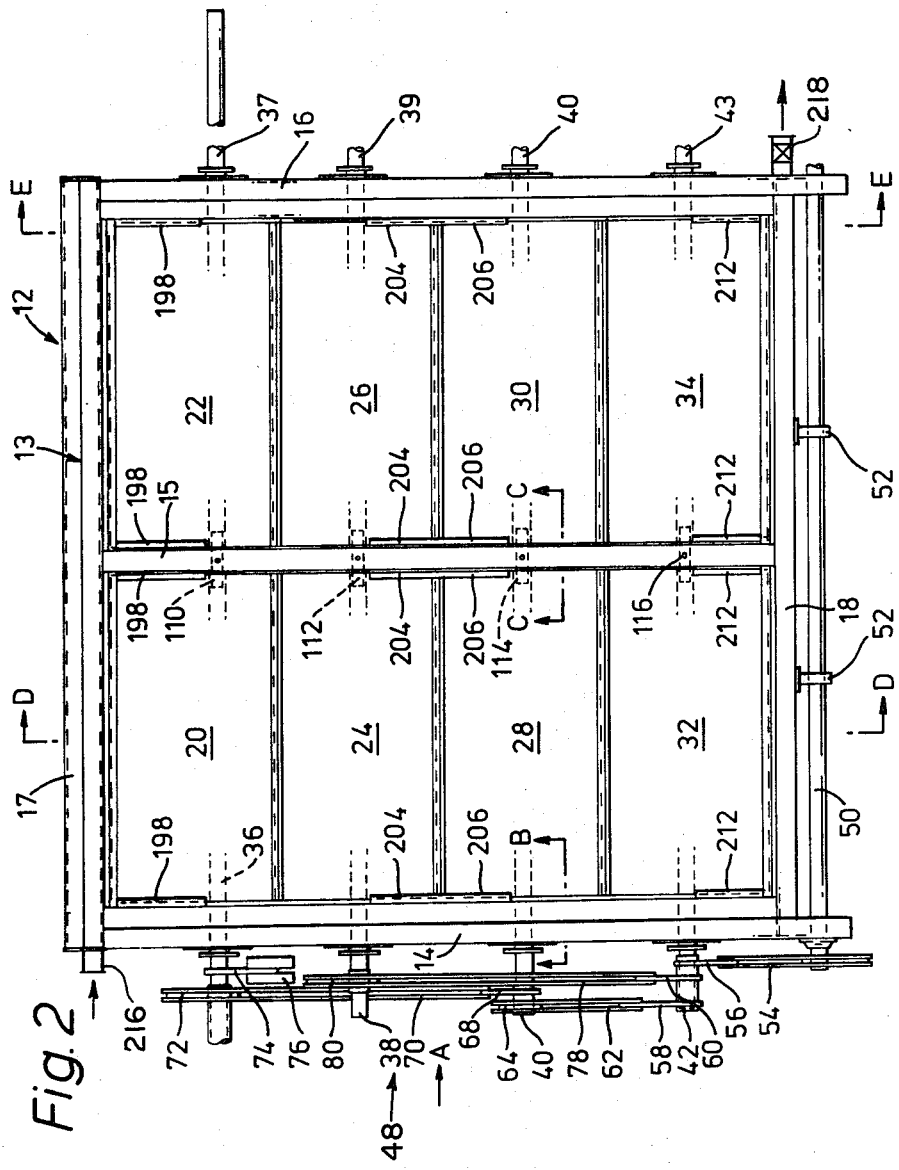
FIG. 2 is a front elevation of a damper according to the invention.

The damper 12 shown in FIG. 2 comprises a number of metal sections fabricated so as to form a frame 13 having three upright hollow members 14, 15 and 16 extending between a hollow top member 17 and a hollow bottom member 18. The damper frame 13 is made in 43 grade material to BS 4360, aluminium coated to BS 5269 part 2, Class D, or other heat-resistant material. Within the frame are eight damper blades 20 to 34, arranged in four pairs 20 and 22, 24 and 26, 28 and 30, and 32 and 34. Each pair of blades is carried on its own respective shaft 36 to 42.

At either side of the damper 12 is a control mechanism 48 comprising a number of links for opening and closing the blades. For simplicity a mechanism 48 is only shown at one side in FIG. 2. As best shown in FIG. 2 the mechanisms 48 at either side of the frame 13 are connected together by a shaft 50 so that the two mechanisms can operate together to open and close all of the blades 20 to 34 simultaneously. The shaft 50 is rotatably journalled in Tufnol bearing blocks 52.

Figure 3:
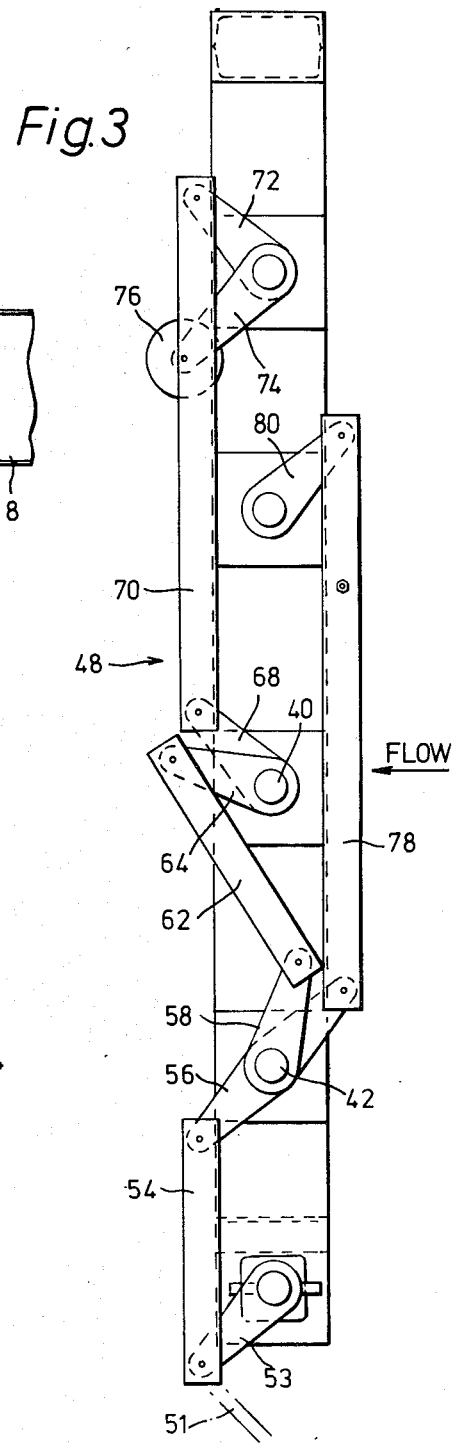
FIG. 3 is a side elevation taken in the direction of line A of FIG. 2.

To open the blades 20, 24, 28 and 32, a link 54 is given an upwards motion (as shown in FIG. 3) by means of an actuating rod 51. This causes a two armed crank 56 to rotate clockwise which rotates shaft 42 to which it is connected and the rotation of shaft 42 rotates the blade 32 clockwise. The rotation of shaft 42 also rotates a crank 58 also mounted on the shaft 42. The rotation of link 58 moves link 62 downwards and this in turn rotates the crank 64 and shaft 40 to rotate counter-clockwise thereby in turn causing blade 28 to rotate counter-clockwise. Crank 68 is also mounted on the shaft 40 and so is rotated counter-clockwise by the rotation of shaft 40 and causes a link 70 to move downwards. This downwards movement of the link 70 causes a crank 72 mounted on the shaft 36 to rotate the shaft 36 and its blade 20 in the counter-clockwise direction. Also mounted on the shaft 36 is a crank 74 which has at its free end a counter balance weight 76 the purpose of which will be described below. The rotation of this other arm of the crank 56 causes link 78 to move downwards which causes crank 80 and the shaft 38 on which it is mounted to rotate clockwise together with the blades 24.

The mechanism 48 at the other side of the frame operates in a similar way to open the blades 22, 26, 30 and 34. All of the blades are of course closed when the two mechanisms 48 are actuated in the reverse direction.

Figure 6:
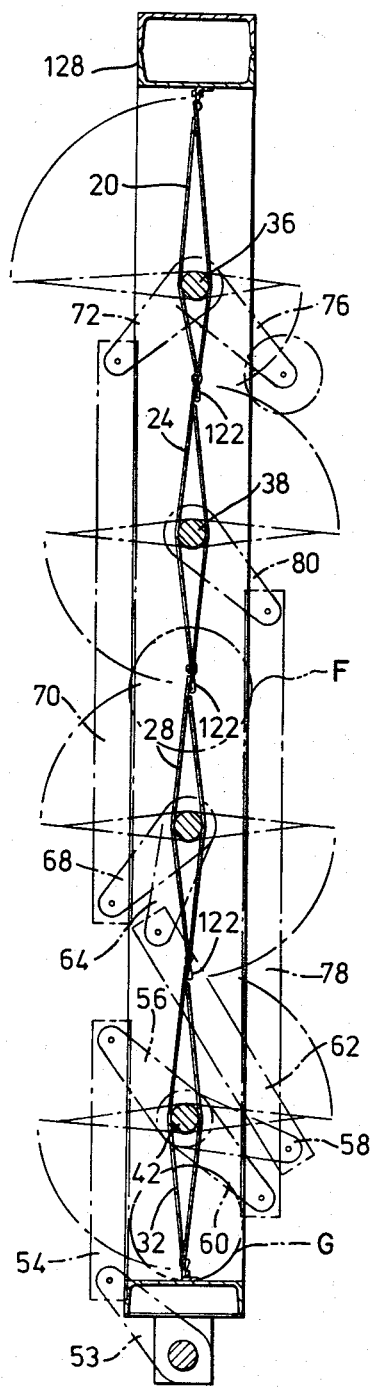
FIG. 6 is a section taken along line D—D of FIG. 2.

FIG. 6 shows the blades 20 to 34 in their closed position in full lines and in their open position in chain-dotted lines; the positions of the links with the blades in their open position are also shown in chain-dotted lines in FIG. 6.

When hot gases are passing through the duct 4, the damper 12 is exposed to these and expansion of the frame 13 could cause the blades to operate prematurely or leak with resultant gas leakage in the duct 10. To avoid significant expansion, cool air is passed under pressure through the members 14 to 18 in the frame from a source not shown through an inlet duct 216.

Figure 4:
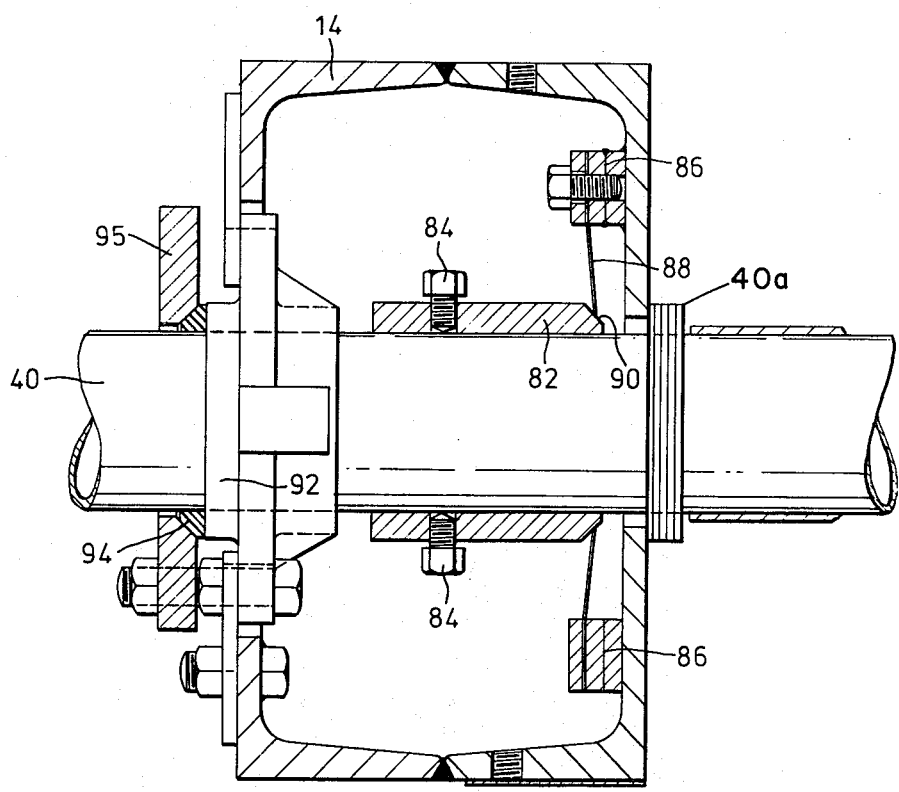
FIG. 4 is an enlarged section taken along line B—B of FIG. 2.

As best shown in FIG. 4, the cool air passing through the member 14 flows over that region in which the shaft 40 passes through the member 14. Around that portion of the shaft 40 situated inside the member 14 is a sleeve 82 held in position by screws 84, the sleeve 82 having a chamfered end 90. Fixed by ring 86 to the wall of the passage is a one-way austenitic stainless steel gland seal 88 in the form of an annulus which bears against the chamfered end 90 of the sleeve 82. The cool air which passes around the shaft 40 is arranged to be at a higher pressure than the gas in the duct and so the cool air can escape from the member 14 by urging the seal 88 away from the chamfered end 90 of sleeve 82. To vary the rate at which the cold air can escape the sleeve 82 can be moved to the left or right of the direction shown in FIG. 4; by moving the sleeve to the right greater pressure is required to lift the seal 88 from contact with end 90, and by moving the sleeve to the left less pressure is required to lift the seal 88.

On the outer side of the member 14 the shaft 40 is rotatably journalled supported in a bearing 92 fixed to the wall of the member 14. To prevent loss of cool air through the bearing 92, a soft asbestos ring 94 extends around the shaft 40 to give a seal and this ring 94 is held in place by a ring 95 fixed to the outer wall of the member 14. Because the bearing 92 is positioned in the outer wall of the member 14 and because it is cooled by the passage of the cool air through the member 14, the bearing is not subjected to extremes of temperature and so can work freely. Also because the shaft 40, and all the other damper shafts 36 to 43 are hollow, the amount of conduction which can occur from the hot gases is reduced as compared with solid shafts. To ensure free movement of the shaft 40, waders 40a are provided between the blade 28 and the inner wall of the member 14.

Although only the cooling of the left hand end of the shaft 40 has been described and shown in detail, the left hand ends of the damper shafts 36, 38 and 42 are cooled in the same way, and the cooling of the right hand ends of the damper shafts 37, 39, 41 and 43 is effected in a similar manner by the cool air which flows through the member 16.

Figure 5:
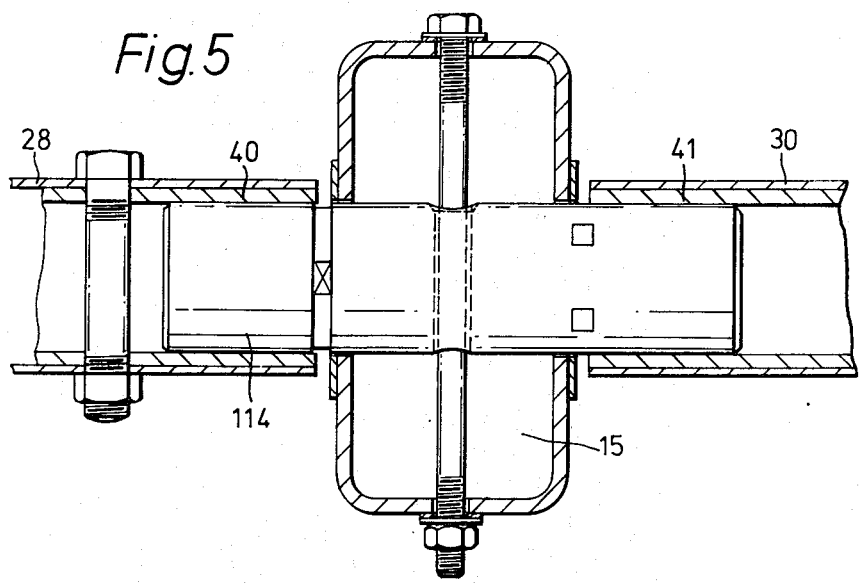
FIG. 5 is an enlarged section taken along line C—C of FIG. 2.

As best shown in FIG. 5 cool air under pressure flows along the central member 15 and over central bearing rods 110, 112, 114 and 116 which extend through the member 15. The bearing rods 110, 112, 114 and 116 are made of mechanite. The inner end of the hollow shafts 40 and 41 rotatably fit over the bearing rod 114 and are rotatably journalled by that rod 114. The cool air flowing over the bearing rod 114 keeps the latter cooler than the shafts 40 and 41 and so its expansion is less when exposed to the hot gases with the result that the shafts can always rotate freely. In addition the differential movement of the frame 13 is kept to a minimum and growth is concentrated at the centre by the shafts 40 and 41 being allowed to slide over the bearing 114 eliminating the use of bolts in slotted holes.

Although the support of the inner ends of the shafts 40 and 41 has only been described and shown in detail the inner ends of all of the other shafts are supported in the same manner.

Apart from escaping from the members 14, 15 and 16 via the seals 88, the cool air can escape through a non-return air valve 218. This valve is positioned at a point on the frame diagonally opposite to the point of entry of the cool air supply. The ratio of cold air which escapes via the seal 88 to that which escapes through the non-return valve depends on the circumstances in which the damper is being used and the ratio can be found by experimental analysis to obtain the best balance possible with an adequate flow of air for cooling.

By cooling in this manner, the bearings for the shafts 36 to 43 can be cooled effectively and the frame 13 can be cooled.

Figure 10:
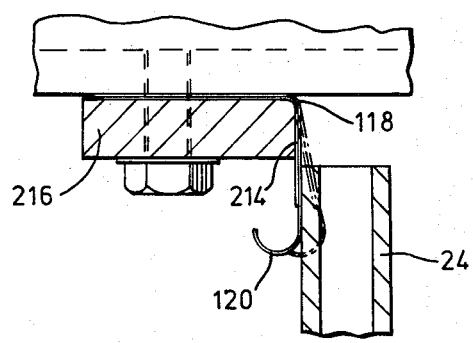
FIG. 10 is a section taken along line F—F of FIG. 8.
Figure 7:
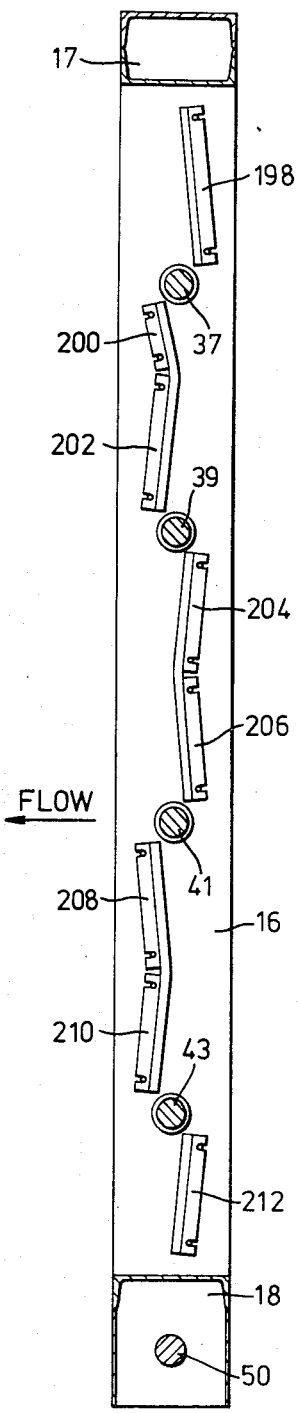
FIG. 7 is a section taken along line E—E of FIG. 2.

As best shown in FIGS. 2 and 7, seals 198, 200, 202, 204, 206, 208, 210, 212 are fixed to the frame members 14, 15 and 16 at each end of each damper blade. Each seal is best shown in FIG. 10 and is in the form of a thin spring metal strip 214 having a rounded end 120 the strip 214 being fixed in place by a metal bar 216 e.g. of austenitic steel, both to the frame. The strip 214 has a bend 118 and the strip 214 normally rests in the position shown in chain-dotted lines. However, when the damper blades are in the closed position, the edges of the blades bear against the respective metal strips 214 bending the strip from its position shown in chain-dotted lines and deflecting it to that shown in full lines in FIG. 10. The positive contact between the edge of each blade and the metal strips 214 gives good sealing at the side edges of the blades. The seals 198 to 212 can be, for example, of metal or Scandura DP 23SS mesh covered.

Figure 8:
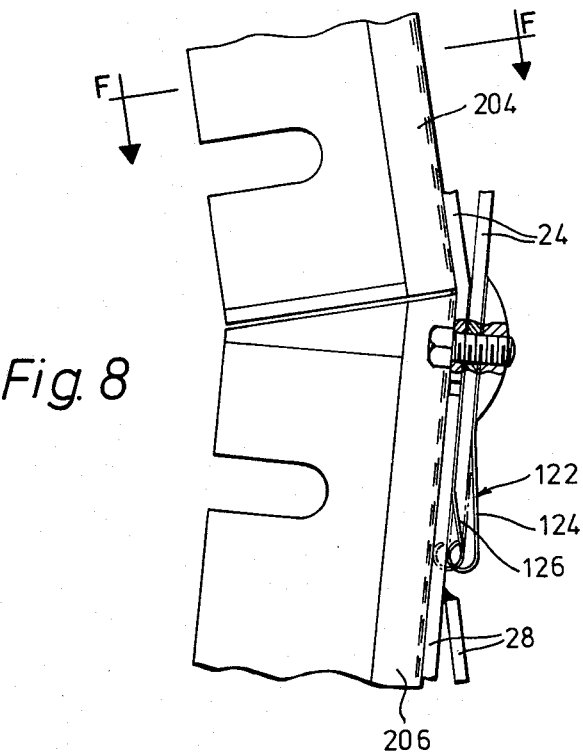
FIG. 8 is an enlarged detail of the portion of FIG. 6 enclosed by circle F.

In order to seal the blades along their upper and lower edges, the lower edge of each blade, except blades 32 and 34, has an austenitic steel flexible leaf seal 122 fixed thereto as is best shown in FIG. 8 which shows the extent between the edges of blades 24 and 28. When the damper blades are in their closed position the tips of the blades bear against each other and in so doing the leaf seal 122 and, as shown in FIG. 8, the seal 122 is biased from its rest position shown in chain-dotted lines to that shown in full lines. As with the transverse edges of the blades the positive resilient contact gives good sealing along the upper and lower axial edges of the blades.

However the leaf spring 122 comprises two flexible metal elements 124 and 126. The element 126 is straight but the free end of the element 124 is curved around the free end of element 126. Thus when the blades are closed, the edge of a blade engages the curved part of the element 124 which in turn engages the free end of the element 126 thereby making the seal stiffer than if one element were used.

Figure 9:
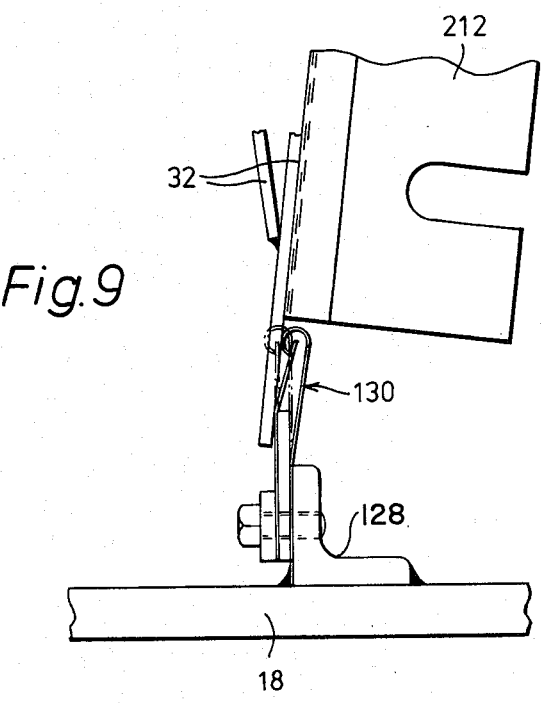
FIG. 9 is an enlarged detail of the portion of FIG. 6 enclosed by circle G.

As best shown in FIG. 9, the bottom frame member 18 has a seal 130 bolted to a flange 128 fixed to the member 18. The seal 130 is similar to the seals 122 and the lower edge of the blades 32 and 34 are sealed by biasing the leaf seal 130 from its rest position shown in chain-dotted lines to that shown in full lines.

The upper edge of the blades 20 and 22 also bear against seals fixed to the top member 17 in a similar manner.

The blades 20 and 22 are also intended to act as pressure relief dampers. Therefore they have to be able to open automatically to avoid the necessity of providing a separate pressure relief damper with additional ducting.

To help the blades 20 and 22 open automatically when an excess pressure exists in the duct 4, they are eccentrically mounted on the shafts 36 and 37 (see FIGS. 2 and 6). The counterweight 76 is also arranged to bias the blades to their open position since it is positioned so as to create a torque in the opening direction of the blades. The blades 20 and 22 are normally held closed by clutches (not shown) positioned outside the damper frame 13 and connected to the shafts 36 and 37. When the clutches are released by a sensing trip mechanism 214, as shown in FIG. 1 which is sensitive to the pressure in the duct 4, the out-of-balance torque on the blades created by the pressure of the gases in the duct and the counterweight 76 opens the blades to release gases through the duct 10. The blades stay open once the excess pressure is released and are thereafter manually re-set.

The damper 6 can be similar to the damper 12 except that it must not open automatically under the affect of excess pressure. Accordingly it is identical to the damper 12 except that the blades 20 and 22 are not eccentrically mounted and the counterweight is not provided.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A damper for controlling the passage of hot gases through a duct, said damper comprising:
   (i) a frame,
   (ii) at least one opening defined within said frame,
   (iii) at least one damper positioned within said opening,
   (iv) a shaft for each damper, said shaft being rotatable whereby said damper blade is movable between a closed position in which said damper blocks said opening and an open position in which gases can pass through said opening,
   (v) at least one passageway in said frame,
   (vi) means for passing a coolant through said passageway in said frame,
   (vii) a bearing for one end of said shaft, said one end passing through said frame and said bearing being attached to said frame and cooled by passage of coolant through said passageway in said frame, and
   (viii) a one-way seal provided where said one end of said shaft passes through said frame to allow flow of coolant from said passageway into said duct and prevent flow in reverse.

2. A damper according to claim 1 in which said frame is in the form of a rectangle and further comprises a central upright member thereby defining two openings with at least one damper in each, a passageway being provided through said central member.

3. A damper according to claim 2 further comprising at least one bearing rod extending through and projecting from said central member, the ends of said shafts for said blades adjacent said central member being slideably and rotatably supported over said bearing rods.

4. A damper according to claim 1 in which said bearing for said one end of said shaft is positioned adjacent the outer side of said frame.

5. A damper according to claim 1 in which said one-way seal comprises a ring of resilient, heat-resistant material fixed to the inner wall of said frame around said shaft, and a sleeve mounted on said shaft bearing against said ring.

6. A damper according to claim 1 further comprising a non-return outlet valve for releasing coolant from said passageway in said frame, said valve being positioned at a location remote from means for supplying coolant to said frame, whereby a flow of coolant through said passageway in said frame can be maintained.

7. A damper according to claim 1 in which at least one blade is eccentrically mounted on its shaft so that it tends to open under the effect of gas pressure attempting to pass through said duct.

8. A damper according to claim 7 further comprising a counterweight attached to said shaft on which a blade is eccentrically mounted to assist in opening said blade.

9. A damper according to claim 7 further comprising sensing means to release said eccentrically mounted blade for opening when the pressure in said duct exceeds a predetermined figure.

10. A damper according to claim 1 further comprising at least one resilient seal for sealing the damper when in its closed position, said resilient seal comprising a first resilient sealing element having a free end arranged to provide the seal by engagement and deflection upon contact when said blade is in its closed position, and a second resilient element arranged to be engaged by and give additional stiffness against further deflection to said first resilient sealing element when the latter has become deflected to a predetermined extent.

* * * * *